H. C. ALGER.
LIQUID METER.
APPLICATION FILED APR. 13, 1914.

1,132,994.

Patented Mar. 23, 1915.
2 SHEETS—SHEET 1.

WITNESSES

INVENTOR
Harley C. Alger

H. C. ALGER.
LIQUID METER.
APPLICATION FILED APR. 13, 1914.

1,132,994.

Patented Mar. 23, 1915.
2 SHEETS—SHEET 2.

WITNESSES
J. E. Dischinger
A. J. Reithrauff

INVENTOR
Harley C. Alger

UNITED STATES PATENT OFFICE.

HARLEY C. ALGER, OF CHICAGO HEIGHTS, ILLINOIS.

LIQUID-METER.

1,132,994.    Specification of Letters Patent.    Patented Mar. 23, 1915.

Application filed April 13, 1914. Serial No. 831,504.

*To all whom it may concern:*

Be it known that I, HARLEY C. ALGER, a citizen of the United States, residing in Chicago Heights, in the county of Cook and State of Illinois, have invented new and useful Improvements in Liquid-Meters, of which the following is a specification.

My invention relates to improvements in liquid meters which register the flow or the quantity of liquid by indicating the rate of flow on a scale, by recording the rate of flow upon a chart or by integrating or counting the total quantity of water which has passed through the measuring element of the meter. The measuring element may comprise an opening, orifice or a weir of any preferred shape or a measuring chamber or compartment which delivers liquid in unit charges and the application of my invention to various measuring elements is hereinafter more fully described.

In liquid meters having registering mechanism it is usual to employ clock work for driving the mechanism and in using such clock work it is necessary that an attendant wind the clock work in order to keep the registering mechanism in operation. In my device, however, I provide means driven by the liquid for furnishing power for driving the mechanism, or for winding clock work for driving the mechanism so that the device becomes self-winding and automatic.

One object of this invention is to provide a meter having registering mechanism, driven by the power of the liquid passing through the meter. The registering mechanism may be driven direct or it may be operated by clock work which is driven by the power of the liquid.

Another object is the construction of a device of this character wherein the means for driving or operating the registering mechanism is operated automatically.

Another object is the construction of a device of this character which will operate continuously and with greater efficiency than has heretofore been possible.

These objects I accomplish by providing suitable means driven by the liquid, such for example as a liquid motor, tipping box or water wheel for operating the registering mechanism or for furnishing power to a suitable power storage device which in turn operates the registering mechanism, by providing means for making the operation automatic and by certain constructions which will be hereinafter more fully described.

Figure 2:
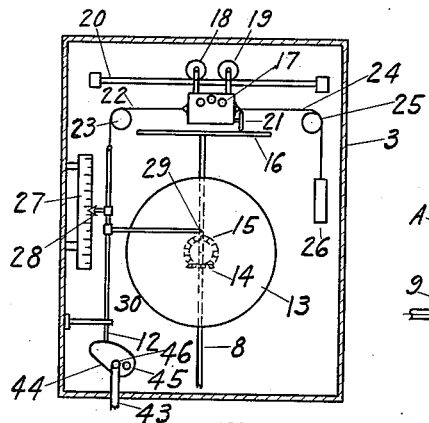
Figure 1:
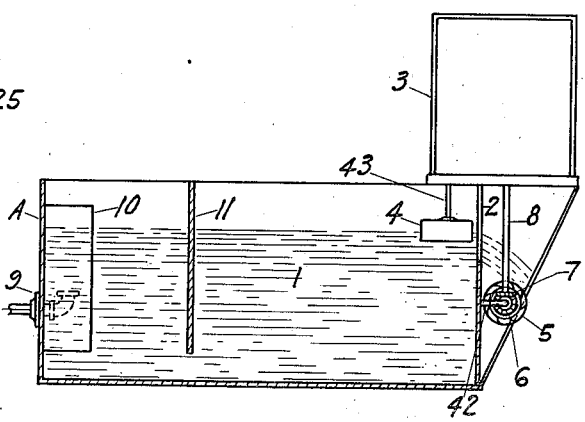
Figure 3:
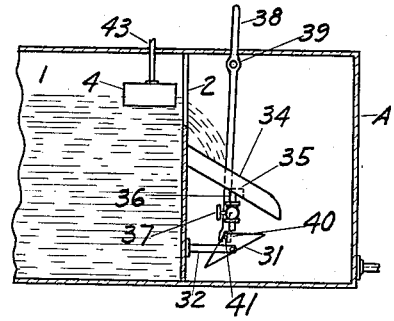
Figure 4:
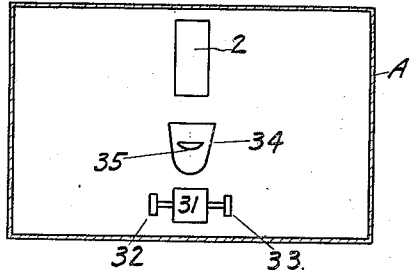
Figure 5:
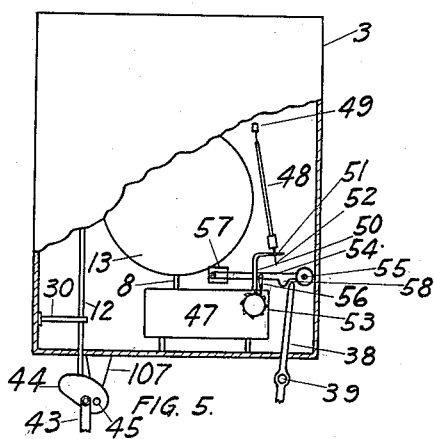
Figure 6:
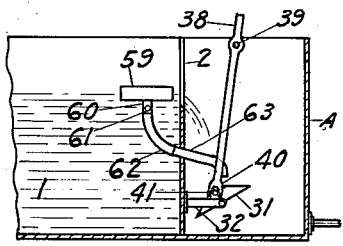
Figure 7:
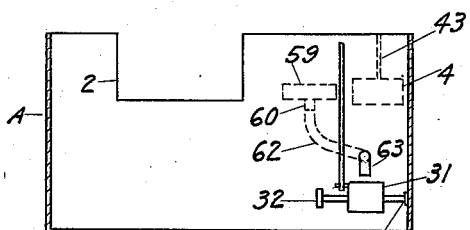
Figure 9:
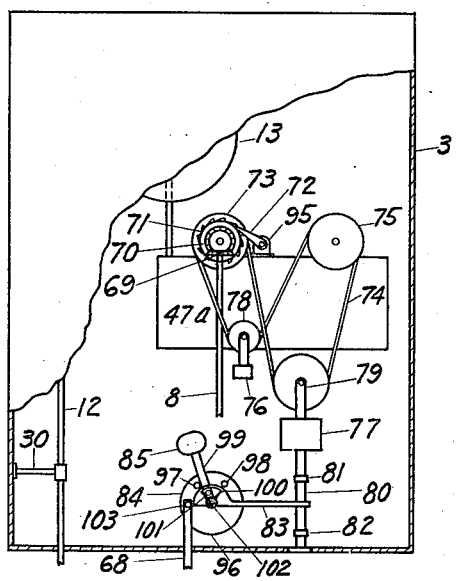
Figure 10:
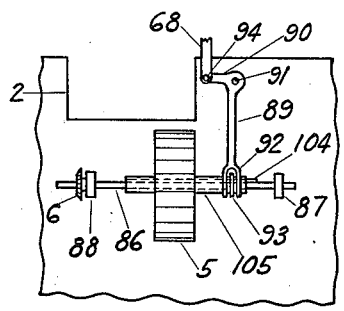
Figure 8:
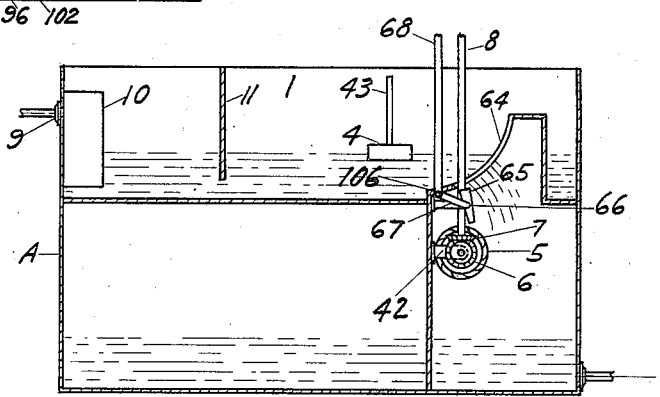

In the accompanying drawings, Figure 1 shows a sectional elevation of a meter embodying my invention in connection with an opening or weir for measuring water or other liquids. Fig. 2 shows a front elevation, partly in section, of registering mechanism which may be adapted for use with openings, weirs or orifices for registering the flow of water; Fig. 3 shows a side sectional elevation of a modification of my invention; Fig. 4 shows an end sectional elevation of Fig. 3; Fig. 5 shows a modification of a registering mechanism, partly in section, which may be used with my invention; Fig. 6 is a sectional elevation showing a modification of my invention; Fig. 7 is an end sectional elevation of Fig. 6; Fig. 8 is a sectional elevation of another modification of my invention; Fig. 9 is a front elevation, partly in section, of a register which may be used with the construction shown in Fig. 8 while Fig. 10 shows another modification of my invention.

In Fig. 1, A represents the shell of a suitable conduit, pipe or weir chamber 1 for leading water to an opening or weir 2 which may be of any preferred construction. Suitable mechanism within the case 3 and actuated or controlled by the float 4 which may be operated by the head of liquid within the chamber may be used to register the flow of liquid passing through the opening. A water motor of any preferred type such for example as a relatively small water wheel 5 supported by a bracket 42 is so placed as to receive a small portion of the liquid passing through the meter or passing over the weir and drives a shaft 8 which operates through the bevel gears 6 and 7 to operate the registering mechanism. Water entering the inlet connection 9 passes into the weir chamber 1 where suitable baffles 10 and 11 may be used to insure that the level of liquid within the chamber is quiet. As the water rises and falls within the chamber, the float 4 will rise and fall and thereby actuates or controls the registering mechanism by means of the float rod 43 and the liquid passing through the meter will drive the water wheel 5 causing the shaft 8 to revolve as above described.

Any preferred form of registering mechanism may be used and in Fig. 2 I have shown suitable mechanism for the purpose. A recording member comprising a chart of the disk or drum type, a disk chart 13 being shown, is mounted within the case 3 and may be rotated by the shaft 8 by means of bevel gears 14 and 15. The shaft 8 may also drive a friction disk 16. A counter or integrator 17 which is preferably carried by wheels 18 and 19 which travel upon a track or guide 20, suitably mounted within the case 3, has a friction wheel 21 extending therefrom and adapted to receive motion from the disk 16. A cord or flexible cable 22 attached to the integrator 17 passes over a pulley 23 and connects to the upper end of a rod 12. Another cord or flexible cable 24 connected to the integrator 17 may extend in the opposite direction and pass over the pulley 25 and then downward and a weight 26 may be suspended from the end of the cord 24.

With some special forms of weirs where the quantity of water flowing is in direct proportion to the head over the weir, the float 4 of Fig. 1 may connect direct to the rod 12 thereby actuating the registering mechanism. With ordinary orifices or weirs however the quantity of liquid flowing is not in simple proportion to the head and in such cases a cam 44, Fig. 2, may be used to alter the motion. The cam 44 is pivoted at 45 and the float rod 43 is connected to the cam by a pin 46. The rod 12 receives motion from the cam 44 which may be so shaped as to transmit a motion which is proportional to the head although the actual movement of the float may vary as some other function of the head. If the rod 12 is lifted, the weight will move downward drawing the integrator with wheel 21 toward the perimeter of the disk 16 thereby causing the integrator to register more rapidly. The rod 12 is heavier than the weight 26 so that if released the rod will fall drawing the integrator toward the center of disk 16 with the opposite effect and may thus cause the integrator to count the number of gallons or cubic feet of water passing through the measuring element. The friction of the mechanism which constitutes the load upon the water wheel 5 being constant, a wheel may be selected of proper size to drive the mechanism at a substantially constant speed or any suitable means may be used to maintain constant speed.

In Figs. 3 and 4 which show a modification of my invention, a tipping bucket 31 suitably mounted on supports 32 and 33 is used to drive the registering mechanism. A spout 34 receives water passing through the opening 2 and a small portion of the water passing down the spout 34 is intercepted by a shield 35. A pipe 36 is connected to the underside of the shield and supplies water to the tipping box through the valve 37. The shield 35 in the spout 34 will then be filled with water even though a very small stream is flowing through the opening 2 and the valve 37 may be throttled so as to drive the tipping box 31 at constant speed. A lever arm 38 pivoted at 39 has a fork 40 engaging a pin 41 on the tipping box so that the lever arm 38 is oscillated by the movement of the tipping box and furnishes power to drive the registering mechanism. The registering mechanism may be of any preferred type or may be of the type above described having indicating, recording or integrating members. The mechanism may have a geared clock work for operating the same as shown in Fig. 5 where 47 represents clockwork adapted to operate the mechanism through the shaft 8. The clock work shown is of the type having a centrifugal pendulum 48 suitably suspended from a point 49 within the case and driven by a shaft 50 extending from the clock work and having an arm 51 at angle to the shaft and adapted to make contact with a pin 52 extending from the end of the pendulum thereby operating the pendulum. It will be understood that with the centrifugal pendulum no escapement is needed within the clock work. Extending from the clock work 47 is a ratchet wheel 53 adapted by its rotation to wind the clock work. A lever arm 54 pivoted at 55 has a pawl 56 attached thereto and adapted to engage the teeth of the ratchet wheel 53. A weight 57 attached to the arm 54 causes the pawl 56 to move downward thereby winding the clock work. A lug 58 extends from the lever arm 54 and the upper end of the oscillating lever 38 wipes past the lug 58 as the tipping box 31, Fig. 3, tilts thereby raising the lever arm 54 with its pawl 56 and weight 57 which supplies energy to wind the clock work.

In Figs. 6 and 7 which show a modified form of my invention, the tipping box or other means used to supply energy for driving the registering mechanism is provided with additional means for supplying water at constant rate. A float 59 within the weir chamber 1 has a tube 60 attached thereto. An opening 61 is formed in the tube and the distance of the opening 61 below the level of the water within the weir chamber is always maintained constant by the float 59 so that a constant amount of water will flow through the opening 61 and pass to the tube 60. A flexible hose 62 leads from the tube 60 and connects to a pipe 63 which is adapted to deliver water to the driving means which may be a water wheel with mechanism as shown in Fig. 1 or which may be of the tipping box type as shown in Fig. 6. The area of the opening 61 should be made small with respect to the area of the hose 62 so that only a relatively small amount of water will be delivered to the hose and the hose will therefore not deliver water in a solid stream, thus preventing any siphon action. It will be understood that such a water wheel or tipping box may, if desired, have a counter attached thereto which will count the number of revolutions or oscillations and if the quantity of water delivered by such a water wheel or tipping box for each revolution or oscillation is known the quantity of water delivered through the pipe 63 may be obtained and added to the amount of water as given by the main registering mechanism. The quantity of water delivered through the pipe 63 however, may be of such small amount as to be negligible. With this arrangement it will be noted that the driving means will operate and the registering mechanism will be operated for a considerable period of time after water has ceased to flow through the opening 2 due to the storage of water within the chamber 1 and the mechanism will therefore record the length of time during which no water is flowing through the opening 2. With this arrangement the energy stored in the water within the weir chamber is available as well as the energy stored by the winding mechanism, as for example by the weight 57 of Fig. 5.

In Fig. 8 my invention is shown in connection with a weir 64 having a curved projecting opening used for measuring water. A chute 65 mounted so that it may be tilted about a shaft 66 is positioned so as to receive a portion of the water flowing through the weir 64 and deliver this portion for the purpose of operating the driving means, such as for example as the water wheel 5. An arm 67 extends from the chute 65 and a rod 68 is connected by a pin connection 106 to the arm 67. As the rod 68 is moved downward the chute 65 will be tilted in a counter clockwise direction thereby receiving less water and may be tilted so that no water flows to the chute 65 whereupon the movement of the wheel 5 will cease.

In Fig. 9 a mechanism is shown for winding the clock work 47ª which may be of the type with escapement. The shaft 8 driven by the water wheel 5, Fig. 8, operates through a pair of bevel gears 69 and 70 to turn a ratchet wheel 71, attached to a wheel or drum 73. A pawl 72 pivoted at 95 engaging the teeth of the ratchet wheel 71 allows the wheel to turn in a counter clockwise direction and prevents the drum from turning in a reverse direction. A cord 74 passes around the drum 73 also around a pulley 75 and has two weights 76 and 77 suspended therefrom by means of pulleys 78 and 79, as shown. The weight 77 is heavier than the weight 76 which is the main weight used to drive the clock work through the pulley 75. The winding operation may be made automatic by providing means for automatically delivering water to the water motor. One such means is shown in Fig. 9. A wrist plate 96 having two pins 97 and 98 attached thereto, a lever arm 83 having a slot 100 and a lever arm 99 with a weight 85 and having a pin 101 extending into the slot 100 are pivotally mounted upon a pin 102. The rod 68 is attached by a pin connection 103 to the wrist plate 96. A rod 80 extends from the weight 77 and carries two lugs 81 and 82. The ratchet wheel is operated as the water wheel 5 revolves and will wind the cord 74 on the drum 73 drawing the weight 77 upward. When the weight 77 reaches its highest position the lug 82 strikes the arm 83, causing the side of the slot 100 to engage the pin 101 which turns the lever arm 99 with weight 85 in a counter clockwise direction. At a certain position after the weight 85 has passed the vertical center line through the pin 102, the weight will fall and the lever arm 99 will engage the pin 97 causing the wrist plate 96 to turn also in a counter clockwise direction thereby moving the rod 68 downward and turning the chute 65 so that no water will be delivered to the water motor 5, whereupon the winding will cease. The weight 77 will store energy to drive the clock work and when the weight falls so that the lug 81 strikes the arm 83 a reverse operation takes place, water is delivered to the wheel and the clock work is again automatically wound.

Fig. 10 shows a modification of mechanism for automatically cutting out the operation of the water motor. The water wheel 5 is slidably mounted on a shaft 86 having a key 104 sliding within a key way in the hub 105 of the wheel. The shaft is rotatably mounted in suitable supports 87 and 88 and the bevel gear 6 is mounted on the shaft 86. A bell crank comprising arms 89 and 90 is pivotally mounted on a pin 91. The arm 89 has a fork 92 adapted to engage a collar 93 on the hub 105. The rod 68 is connected to the arm 90 by a pin connection 94 and the rod 68 may be operated automatically as described in connection with Fig. 9 so that as the rod 68 moves downward the arm 89 will move the wheel 5 to the right and water will cease to be delivered to the wheel from the weir 2. When the rod 68 is moved upward, the water wheel 5 will again be thrown into position to receive water from the weir 2 thereby making the operation of the winding mechanism automatic. Various other arrangements and constructions embodying my invention may be made and I do not confine myself to the exact constructions set forth.

What I claim as my invention and de- sire to protect by Letters Patent is as follows:

1. In a liquid meter, means for registering the flow of liquid, clockwork for operating the registering means, means driven by the liquid for winding the clockwork and means for causing the driven means to cease the winding operation when the clock work is wound the desired amount.

2. In a liquid meter, registering mechanism, means for storing energy for operating the registering mechanism and movably mounted mechanism driven by the liquid for supplying energy to the storing means.

3. In a liquid meter, registering mechanism, means for storing energy for operating the registering mechanism, means driven by the liquid for supplying energy to the storing means and means for causing the driven means to automatically cease its operation when the storing means has stored the desired amount of energy.

HARLEY C. ALGER.

Witnesses:
I. E. DISCHINGER,
A. G. RUTHRAUFF.